United States Patent [19]

Webster

[11] Patent Number: 5,067,567
[45] Date of Patent: Nov. 26, 1991

[54] REMOTE HANDLING APPARATUS

[75] Inventor: Duncan A. Webster, Warrington, United Kingdom

[73] Assignee: British Nuclear Fuels plc, Warrington, England

[21] Appl. No.: 523,343

[22] Filed: May 14, 1990

[30] Foreign Application Priority Data

May 23, 1989 [GB] United Kingdom ............... 8911826

[51] Int. Cl.$^5$ ............................................. B23Q 5/00
[52] U.S. Cl. ..................................... 173/141; 173/45; 173/163; 173/165; 81/55; 81/429
[58] Field of Search ............... 173/37, 45, 163, 165, 173/141; 81/54, 57.11, 57.31, 57.42, 55, 429, 56

[56] References Cited

U.S. PATENT DOCUMENTS

| 2,705,030 | 3/1955 | Koffler et al. ..................... 81/429 |
| 2,860,882 | 11/1958 | Whitney . |
| 3,162,072 | 12/1964 | Stewart ............................ 81/55 |
| 3,800,839 | 4/1974 | Bogle et al. ...................... 81/429 |
| 4,043,365 | 8/1977 | York ................................ 81/429 |
| 4,162,639 | 7/1979 | Gill ................................. 81/429 |
| 4,202,107 | 5/1980 | Watson . |
| 4,484,854 | 11/1984 | Chitayat . |
| 4,613,000 | 9/1986 | Moore ............................. 173/163 |
| 4,801,240 | 1/1989 | Hauta et al. . |

Primary Examiner—Douglas D. Watts
Assistant Examiner—Scott A. Smith
Attorney, Agent, or Firm—William R. Hinds

[57] ABSTRACT

Apparatus for remote handling operations in which a tool carrier is provided with elongate resilient members which permit transverse or lateral displacement of the tool carrier to thereby cater for misalignment between the tool carrier and an object to be engaged by a tool mounted on the tool carrier. During such displacement the resilient members maintain the axis of the tool parallel to the axis of the remainder of the apparatus.

5 Claims, 3 Drawing Sheets

REMOTE HANDLING APPARATUS

The present invention concerns apparatus for remote handling and manipulation.

In situations and plant involving hazardous materials it is essential for operator health and safety that the materials are isolated from the environment. Consequently operations such as routine maintenance, repairs and the like must be performed at a distance to protect the operator. In the nuclear industry this involves working with manipulators behind shielding.

The aim of the invention is to provide apparatus for remote operation and which is capable of compensating for misalignment between the apparatus and workpiece.

According to the present invention, there is provided remote handling apparatus comprising a tool carrier slidable axially within a support member between extended and retracted positions, the tool carrier being connected for rotation with the support member, and means for accommodating misalignment between a tool on the tool carrier and an object to be engaged by the tool to permit lateral adjustments of the tool carrier perpendicular to the longitudinal axis of the tool carrier while maintaining the longitudinal axis of the tool carrier parallel to the longitudinal axis before adjustment, the means for accommodating misalignment comprising elongate resilient members connected between an end of the support member, on the one hand, and a housing for transmitting rotational drive to the tool carrier, on the other hand.

The invention will be described further, by way of example, with reference to the accompanying drawings; in which.

Figure 1:
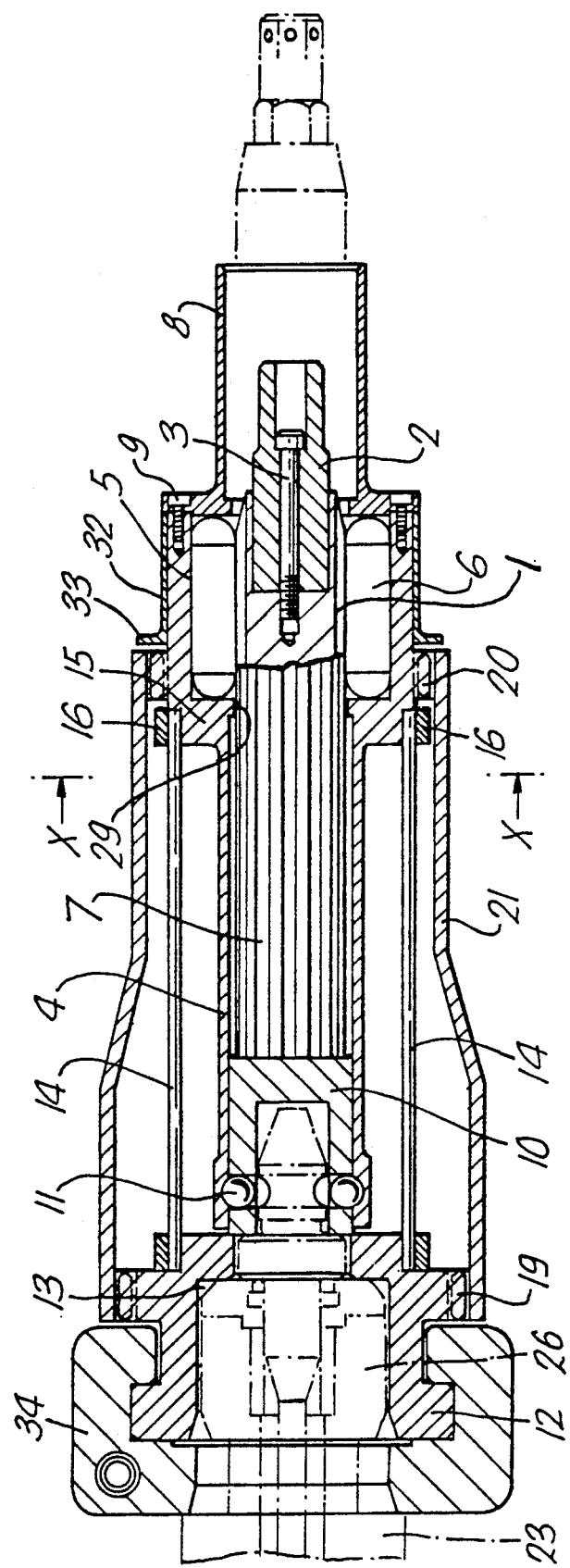
FIG. 1 is a longitudinal section of a first part of a remote handling apparatus.

In FIG. 1, a tool carrier in the form of a mast 1 carries a tool 2, the tool 2 being mounted in a recess in an end of the mast and secured by a bolt 3. As an example only, the tool 2 can be adapted to engage in and cooperate with the head of a socket screw and the leading end of the tool is chamfered to assist in the engagement with the screw. Spring-loaded detent plungers can be provided in the head of the screw to releasably engage corresponding recesses in the tool whereby the tool and screw can be joined for axial movement. For rotational movement and transmitting torque the tool and socket in the head of the screw have complementary flat faces.

The mast 1 is slidable within a tubular member 4 and the end of the member 4 adjacent the tool 2 is enlarged radially to form an annular chamber 5 about the mast 1. The chamber contains a ball spline 6 or like device which cooperates with axial grooves 7 in the mast 1. The end of the chamber 5 is closed by an extension 8 secured by bolts 9 and extending axially beyond the tool 2 when the latter is in a retracted position as shown in FIG. 1.

An integral cup-shaped member 10 at the end of the mast remote from the tool 2 is a sliding fit within the tubular member 4. The cup 10, and hence the mast 1, is releasably secured within the tubular member 4 by means of a ball-race 11 carried by the cup and engageable in recesses in the wall of the tubular member 4.

Figure 3:
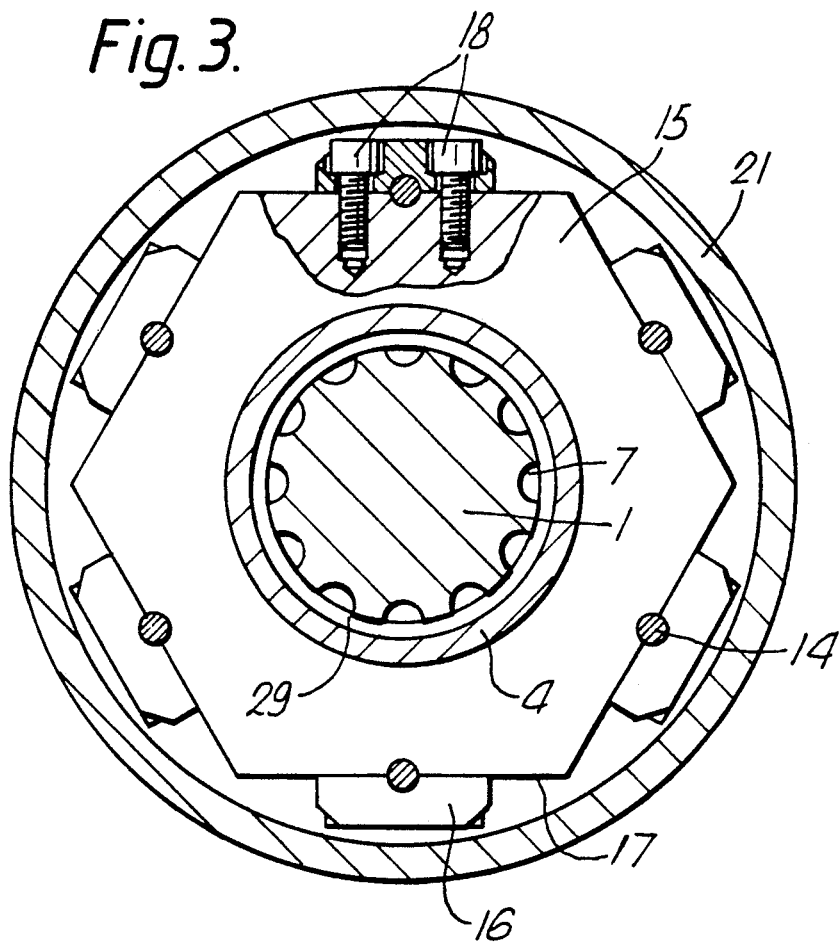
FIG. 3 is a section, not to scale, on X—X in FIG. 1.

Cylindrical housing 12 having a through bore 13 is arranged adjacent the end of the tubular member 4. The housing 12 is connected by a plurality of spring steel rods 14 to wall 15 of the chamber 5. As seen in FIG. 3, wall 15 is formed with flats 17 and a spring steel rod 14 is secured by a clamp block 16 to each flat face 17 of the wall 15. The clamp blocks 16 are secured by bolts 18 to the flat faces 17. In a similar fashion, the opposite ends of the rods 14 are secured to the housing 12.

The housing 12 and the wall 15 are each formed with an integral external gear ring or splines 19 and 20 respectively. The gear rings 19 and 20 mesh with corresponding inwardly directed gear rings or splines provided at the ends of a tubular housing 21 located about the rods 14. The intermeshing gear rings or splines are shaped and dimensioned to permit movement of the housing 21. Thus, the gear teeth or splines are bowed axially and there is both radial and angular clearance between the cooperating gear teeth or splines. A sleeve 32 mounted on the wall 15 and having a radially outward flange 33 forms a stop against axial movement of the housing 21 in a direction towards the tool 2. Likewise, a collar 34 formed in two inter-engageable parts and mounted on the housing 12 prevents axial movement of the housing 21 in the opposite direction.

Figure 2:
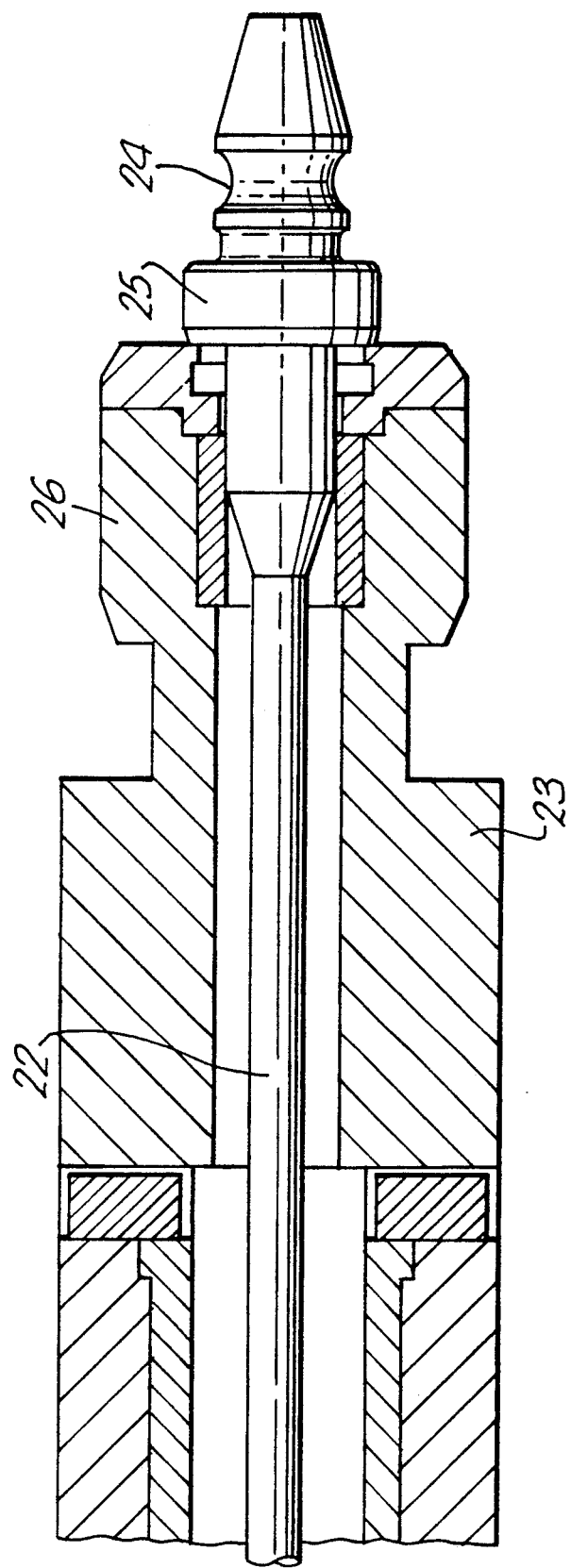
FIG. 2 is a longitudinal section, not to scale, of a second part of the apparatus.

FIG. 2 shows an extension shaft 22 of the mast 1 slidable within a housing 23. The leading end of the extension shaft 22, that is the right hand end as seen in FIG. 2, cooperates with the cup 10 at the end of the mast 1. In FIG. 1, the leading end of the extension is shown in phantom outline in engagement with the mast 1. In this position, a peripheral groove 24 adjacent the leading end of the extension lies within the ball-race 11 and a collar 25 on the extension abuts against the end of the cup 10.

Figure 4:
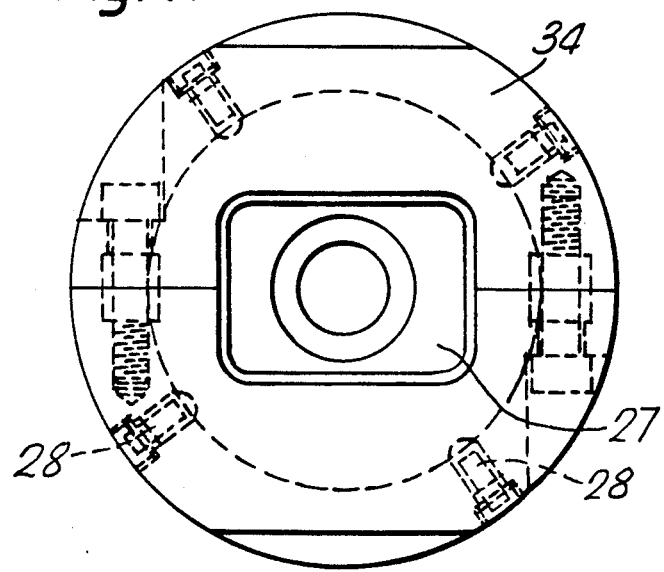
FIG. 4 is an end view of FIG. 1.

The enlarged portion of through bore 13 in the housing 12 is of rectangular section as shown in FIG. 4. The leading end 26 of the housing 23 is of corresponding rectangular section to cooperate and fit within the bore 13. Opening 27 in the locking collar 34 is of similar rectangular configuration. The collar 34 is rotatably mounted on the housing 12 whereby the collar can be rotated, conveniently through 90°, to prevent withdrawal of the leading end 26 from the bore 13 in the housing 12. The collar 34 can be releasably secured in its locking and unlocking positions by means of equispaced spring-loaded detent-plungers 28 on the collar 34 cooperable with recesses in the surface of the housing 12.

In use, the extension in FIG. 2 is attached to the unit of FIG. 1 to form an elongate manipulator capable, if required, of extending through a shielding wall about a radioactive chamber. The two parts are locked together by means of the collar 34 and the tool 2 is displaced beyond the end of the extension 8. This is achieved by axial displacement of the extension shaft 22 to cause the collar 25 to slide the mast 1 along the tubular member 4. In so doing the ball-race 11 is displaced into the groove 24 in the leading end of the extension shaft 22.

Rotational movement is provided at the tool 2 by rotation of the housing 23. The drive is transmitted by the rectangular leading end 26 of the housing 23 to the housing 12. By way of the inter-meshing splines 19, 20 and the tubular housing 21, the tubular member 4 is caused to rotate and this rotation is transmitted to the mast 1, and hence the tool 2, by the ball spline 6 or the like device.

In the event of slight misalignment between the tool and an object to be engaged by the tool, the tool can engage the object on forward movement due to cooperating chamfered faces on the tool and/or object. The resulting small displacement of the apparatus is accommodated by the movement of the housing 21 permitted by the intermeshing gear rings or splines 19, 20.

The spring steel rods 14 permit correction of any slight misalignment between the tool 2 and an object, such as a screw, to be engaged by the tool. Due to the resilience of the rods the tool can be displaced transverse to the axis of the tool and the mast 1. The steel rods 14 ensure that during any such displacement the axis of the mast and the tool 2 at all times remains parallel to axis of the extension shaft 22. The rods 14 allow lateral displacement of the tool 2. In the position of maximum extension of the tool 2 the cup 10 abuts against a radially inwardly directed flange 29 on the tubular member 4.

I claim:

1. Remote handling apparatus comprising a tool carrier slidable axially along its longitudinal axis within a support member between extended and retracted positions, said tool carrier being connected for rotation with the support member, a housing for transmitting rotational drive to the tool carrier, and means for accommodating misalignment between a tool on the tool carrier and an object to be engaged by the tool to permit lateral adjustments of the tool carrier perpendicular to the longitudinal axis of the tool carrier while maintaining the longitudinal axis of the tool carrier parallel to the longitudinal axis before adjustment, said means for accommodating misalignment comprising elongated resilient members connected between an end of the support member, on the one hand, and said housing for transmitting rotational drive to the tool carrier, on the other hand.

2. Remote handling apparatus according to claim 1 comprising a tubular housing around the resilient members and connecting said housing for transmitting rotational drive to said end of the support member.

3. Remote handling apparatus according to claim 2 comprising intermeshing splines at ends of the tubular housing where said connectings are effected.

4. Remote handling apparatus according to claim 3 comprising stop means to resist axial displacement of the tubular housing.

5. Remote handling apparatus according to claim 1 comprising an extension shaft releasably connectable to the tool carrier.

* * * * *